(No Model.)

6 Sheets—Sheet 1.

N. KING & H. B. LESTER.
MACHINE FOR MAKING NAILS.

No. 333,417. Patented Dec. 29, 1885.

WITNESSES

INVENTORS,
Nelson King and
Harry B. Lester.
By their Attorney (No Model.) 6 Sheets—Sheet 2.

N. KING & H. B. LESTER.
MACHINE FOR MAKING NAILS.

No. 333,417. Patented Dec. 29, 1885.

WITNESSES
INVENTORS,
Nelson King and
Harry B. Lester,
By their Attorney (No Model.) 6 Sheets—Sheet 3.

N. KING & H. B. LESTER.
MACHINE FOR MAKING NAILS.

No. 333,417. Patented Dec. 29, 1885.

WITNESSES
INVENTORS,
Nelson King and
Harry B. Lester,
By their Attorney (No Model.)  6 Sheets—Sheet 4.
N. KING & H. B. LESTER.
MACHINE FOR MAKING NAILS.
No. 333,417. Patented Dec. 29, 1885.
Fig. 4.
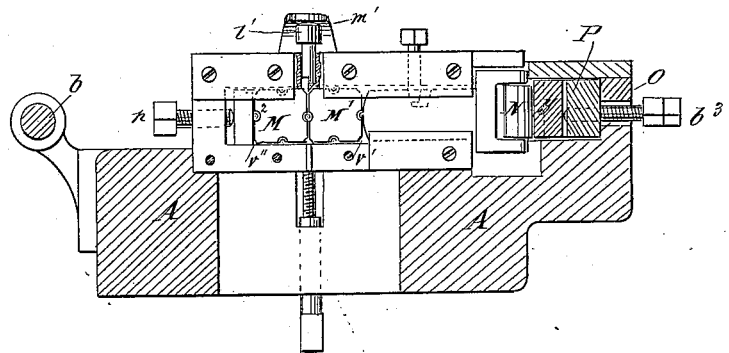
Fig. 5.
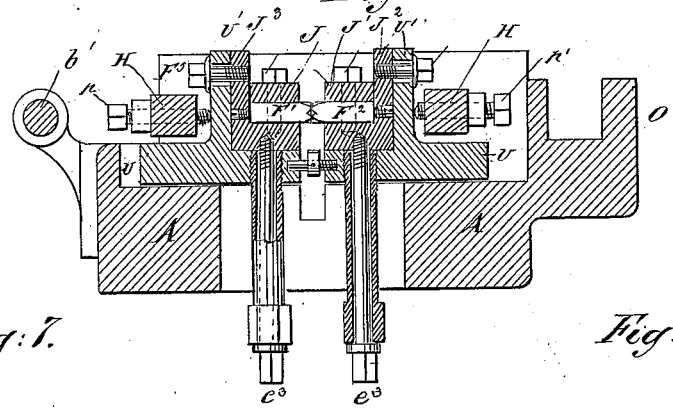
Fig. 7.
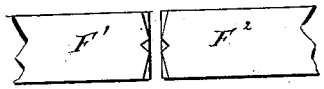
Fig. 8.
Fig. 6.
Fig. 9.
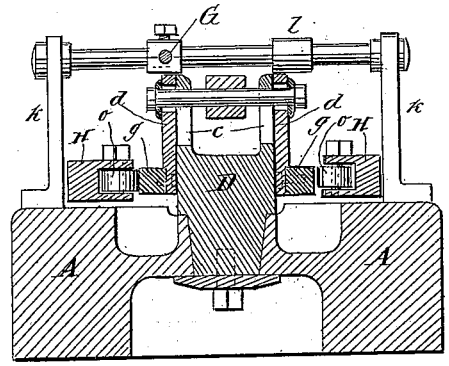
Fig. 10.
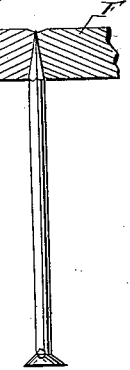
WITNESSES
Chas. Nida
D. A. Carpenter
INVENTORS,
Nelson King and
Harry B. Lester
By their Attorney

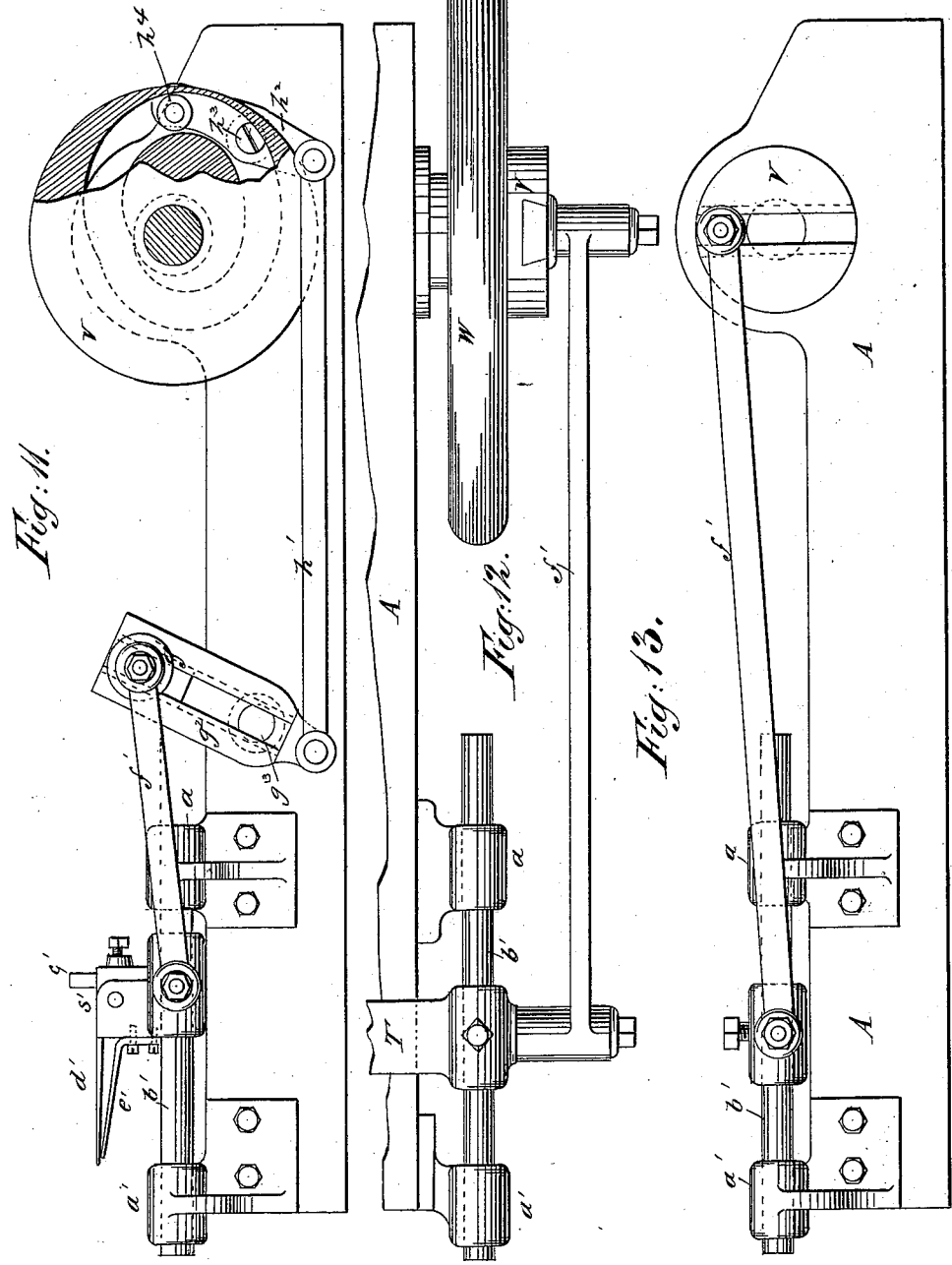

(No Model.) 6 Sheets—Sheet 6.

N. KING & H. B. LESTER.
MACHINE FOR MAKING NAILS.

No. 333,417. Patented Dec. 29, 1885.

WITNESSES
Chas. Nida
D. A. Carpenter

INVENTORS,
Nelson King and
Harry B. Lester,
By their Attorney

UNITED STATES PATENT OFFICE.

NELSON KING AND HARRY B. LESTER, OF WATERBURY, CONNECTICUT, ASSIGNORS TO BLAKE & JOHNSON, OF SAME PLACE.

MACHINE FOR MAKING NAILS.

SPECIFICATION forming part of Letters Patent No. 333,417, dated December 29, 1885.

Application filed May 11, 1885. Serial No. 165,050. (No model.)

*To all whom it may concern:*

Be it known that we, NELSON KING and HARRY B. LESTER, of Waterbury, in the county of New Haven and State of Connecticut, citizens of the United States, have invented a new and useful Improved Wire-Nail Machine; and we declare the following to be a full, clear, and exact description of the same, reference being had to the accompanying drawings, forming part of this specification.

This invention has for its object an improvement in machines for making wire nails; and the invention consists in the devices and combinations hereinafter particularly described, shown, and claimed.

Figure 1:
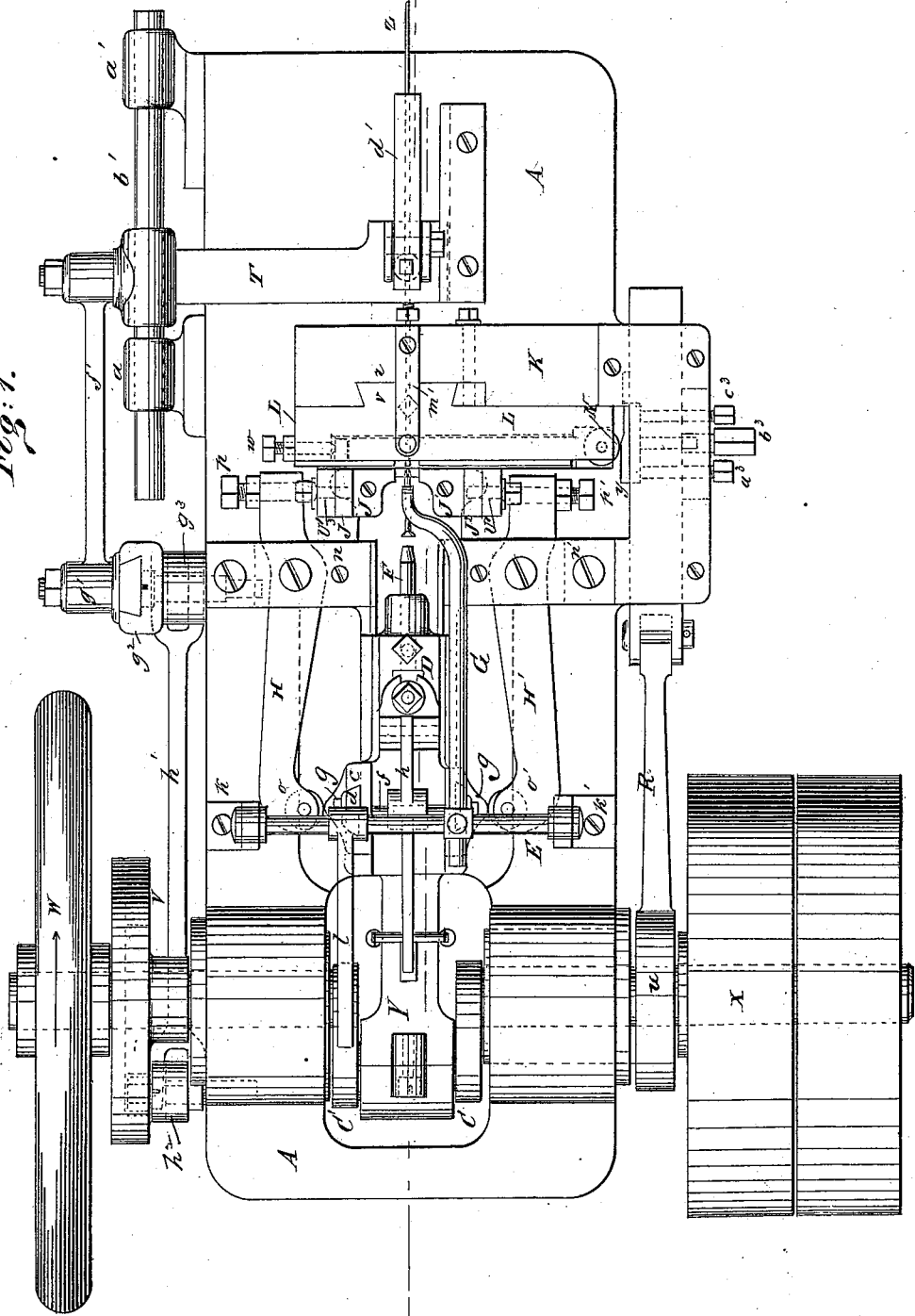
Figure 2:
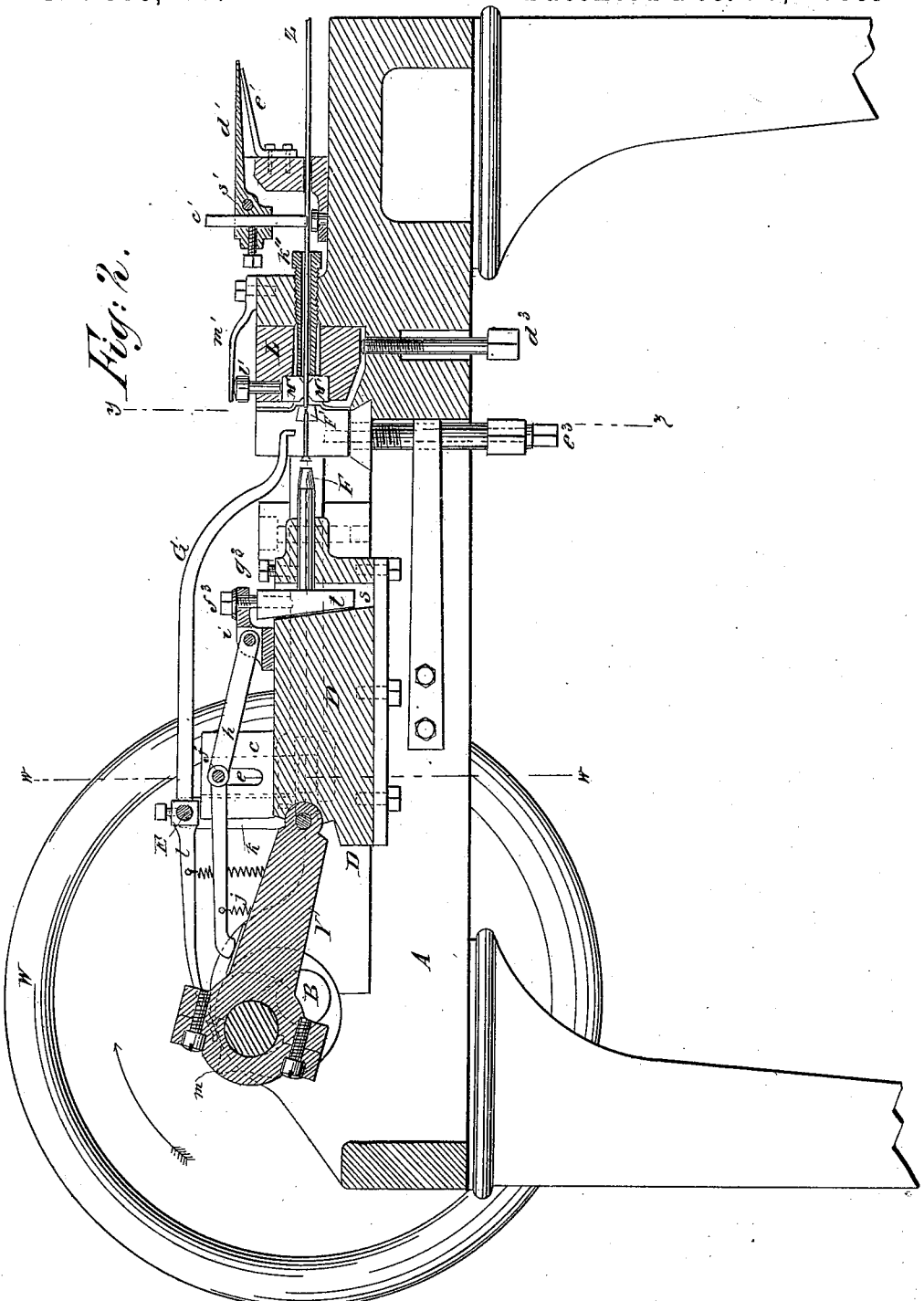
Figure 3:
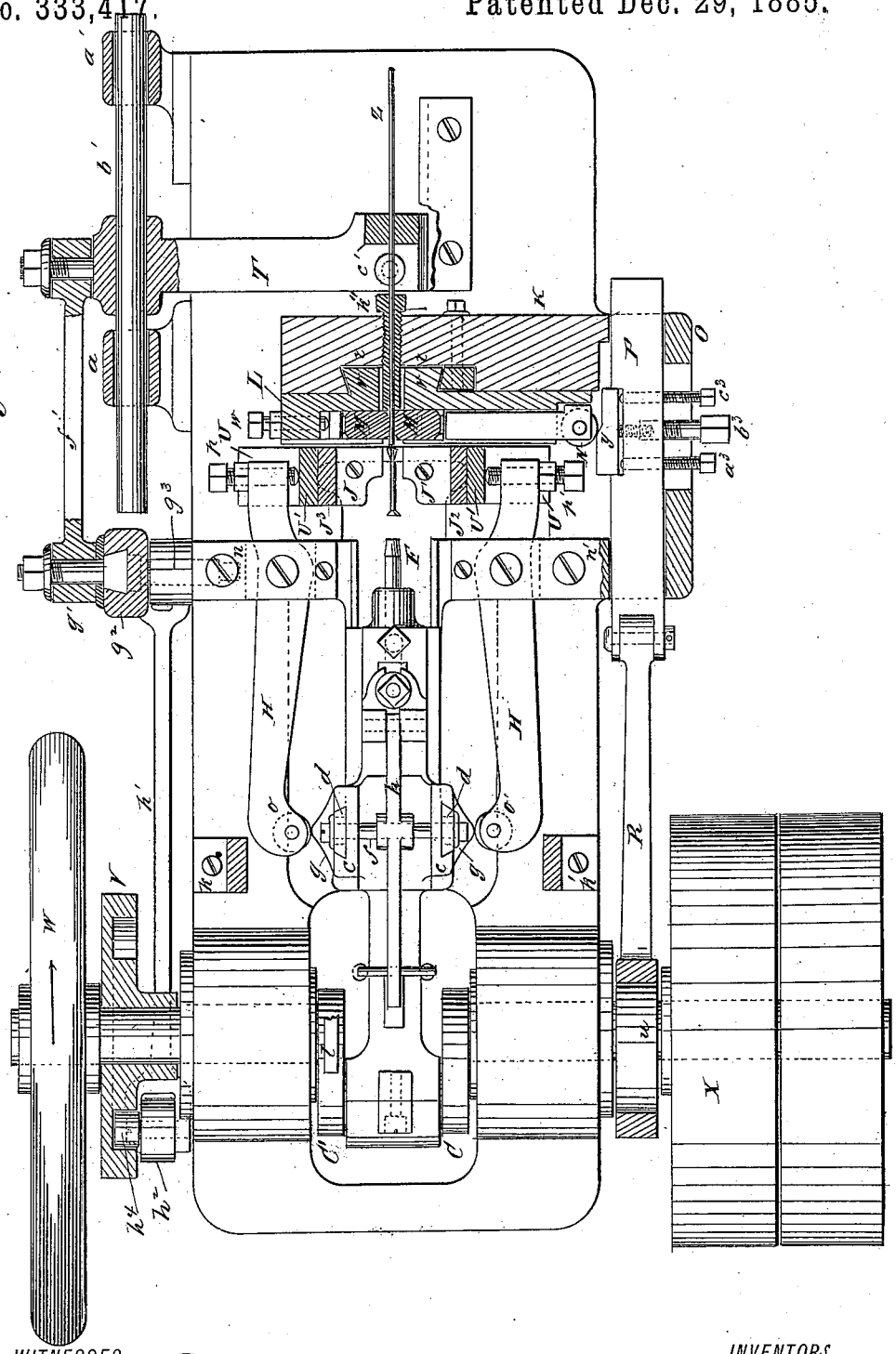
Figure 14:
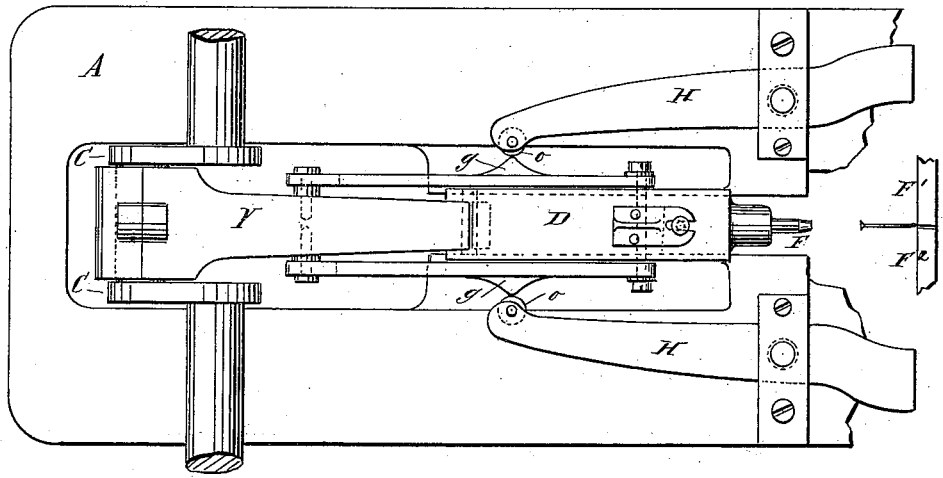
Figure 15:
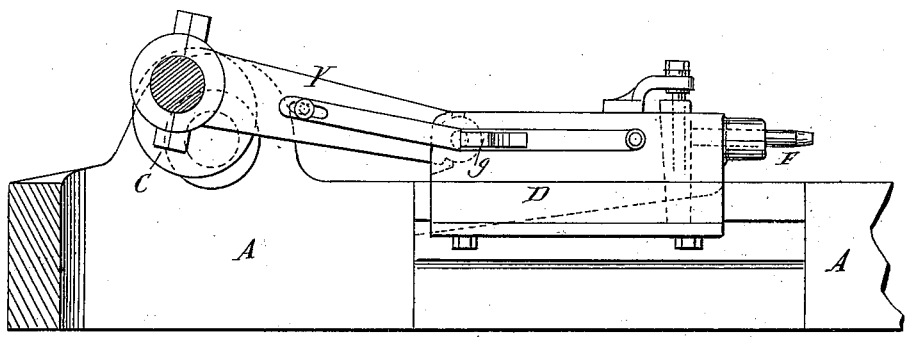
Figure 16:
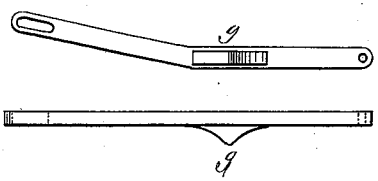

In the accompanying sheets of drawings, Figure 1 is a plan or top view of our nail-machine; Fig. 2, a section of same, taken in the line $x$ $x$, Fig. 1; Fig. 3, a plan or top view partly in section; Fig. 4, a cross-section through line $y$, Fig. 2; Fig. 5, a cross-section through line $z$, Fig. 2; Fig. 6, a cross-section through line $w$, Fig. 2; Fig. 7, plan showing detail of cutters; Fig. 8, edge view of same; Fig. 9, end view of same; Fig. 10, cross-section of cutters, showing the operation when pointing nail; Fig. 11, side view, partly in section, showing details of devices for operating feed; Fig. 12, plan view of modification of same; Fig. 13, side view of feed-operating device as modified; Fig. 14, plan or top view of modified device for operating cutting-chisels; Fig. 15, side view of same; Fig. 16, details of inclines.

Similar letters of reference indicate like parts in the several figures.

This invention, as before stated, relates to an improvement in the construction of machines for making nails from wire. Wire nails and machines for making such nails are old in the state of the art; and this invention pertains only to improvements on machines of that character and the nails made by them, and by this invention it is believed that the machines and nails are bettered.

In the description of our improved machine, and referring to the drawings of the same, A represents the base of the machine, which is supported in any desirable manner by legs or otherwise from the floor. At or near one end of this base, and resting in suitable bearings, is fitted a driving-shaft, B, to one end of which is keyed a driving-pulley, X, and to the other end a balance or fly wheel, W. To this driving-shaft B are likewise fixed midway from its ends cranks C and C', united by a wrist-pin, an eccentric $u$, and a cam-wheel, V.

To the wrist-pin of the cranks C and C' is suitably journaled a connecting-rod, Y, the inner end of this rod being journaled or pivoted to one end of a sliding block, D. In this block D is formed a recess, S. One face of this recess is beveled, as is shown in Fig. 2, and into the recess is fitted a gib, $t$. The inner end of the block has fitted in it a heading-punch, F, the rear end of the punch abutting against the inner face of the gib $t$, the outer end projecting from the block, all of which is shown in Fig. 2. Also to the block D, and on either side of the same, are fixed vertically brackets $c$, into which brackets are formed vertically dovetailed recesses, and into these recesses are fitted sliding blocks $d$. These last-named brackets $c$ have formed in them slots $e$, into which enter the ends of a bar or shaft, $f$, that spans the top of the block D, and unites the two blocks $d$ together, so that they may operate simultaneously.

To the lower end of the blocks $d$, and at right angles to the same and projecting outward from them, are fixed triangular projections or cams $g$.

Journaled upon the shaft or bar $f$ and about midway from its ends is a lifting-bar, $h$, the inner end of the bar $h$ being pivoted to a bracket, $i$, fixed to the upper surface of the block D, and the outer end of said bar resting upon the upper surface of the connecting-rod Y, to which it is held by means of a spiral spring, $j$. Also to the base A are fixed brackets $k$ and $k'$, into which brackets is journaled a shaft, E. To this last-named shaft and extending outward is fixed a lever-bar, $l$, the outer end of this lever resting upon the periphery of the crank C, which crank, it may be as well to mention at this place, has formed on it a projection, $m$. (See Fig. 2.) Also to this shaft E and extending inward is fixed a knocker-bar, G. This knocker-bar is bent to the shape shown in Fig. 2. Also to the base A of the machine, and pivoted to suitable brackets, n and n', are secured cutting-levers H and H'. The outer ends of these levers are provided with rollers o and o', and their inner ends with set-screws p and p'.

Fitted into suitable slideways formed in the base A and transversely of the same are sliding blocks U, with a projection, U', to which are secured at right angles clamps J J' J² J³, for the cutting-chisels F' and F². These chisels are shown in detail in Figs. 7, 8, 9, and 10. The set-screws p and p' abut against the projection U' of the sliding blocks U. Also onto the base A is formed a projection, K, into which is made vertically a dovetailed recess, r, and into this recess is fitted a dovetailed projection, v, which is integral with the rear surface of the block L. The inner face of this last-named block is recessed in the direction of its length, and into this recess are fitted the dies M and M', for clamping or holding the wire while the nail is being formed. One end of the block L is provided with a set-screw, w, which abuts against one of the dies, and the other end of the block L is provided with a sliding bar, which has a roller, N, secured thereon. Also to the base or bed A of the machine is fixed a bracket, O, into which is fitted, so as to slide therein, a bar, P. To the inner surface of this bar P is secured a cam-block, y, the inner surface of this block coming in contact with the roller N. To one end of the bar P is pivoted a connecting-rod, R, the other end of this rod encircling, by a strap or otherwise, an eccentric, S, on the driving-shaft B. Also to the base or bed of the machine are fixed brackets a and a', through which brackets passes a sliding guide-bar, b'.

Upon the sliding guide-bar b' is fixed, by a set-screw or otherwise, an arm, T, which extends partly across the bed A of the machine. The inner end of this arm is provided with a vertical clamping-post, c', and a clamping-lever, d', pivoted thereon, and a clamping-spring, e', bearing against the under side of said clamping-lever. Connected to the other portion of the arm T is one end of a connecting-link, f', (see Fig. 3,) the other end of this link f' being fixed to a stud, g', constructed to have a reciprocating motion in the direction of the length of the base A. The stud g' fits in a longitudinally-grooved oscillating or rocking bar, g², pivoted at g³ to the side of the frame A, said bar being actuated by the rod h', which in turn is jointed to and moved by a rock-lever, h², pivoted at h³ to the frame A, and having a stud, h⁴, engaging the cam-wheel V.

Through the projection K and plate L is inserted a tubular screw, k''. This screw k'' is tapped into the projection K and fits in a vertical slot in the plate L.

The dies M and M' are rectangular in shape, with their corners v' beveled or recessed, as are also the edges of the dies at their middle points, so that when the two dies are placed edge to edge, as shown in Figs. 2, 3, and 4, there is formed a passage for the wire and a cup-shaped recess constituting the die for the head of the nail to be made.

Through the plate L is inserted vertically a pin, l', the inner end of this pin being in contact with the die M', and pressing against the upper end of the pin is a spring, m'.

Having now substantially described the construction of our nail-machine, its operation is as follows: Power being applied in any suitable manner to the driving-shaft B, so that the shaft may turn in the direction indicated by the arrow in Fig. 2, by means of the crank-wheel V and the connecting-rod h', the bar g² is rocked, thereby giving the connecting-rod f' a reciprocating motion, which is imparted to the arm T, so that that arm will reciprocate on the guide-bar b'. Now, the wire Z, led from a suitable reel, passes or is led beneath the lower end of the clamping-post c', which is recessed to receive it, and as the arm T reciprocates, in the manner before described, this clamping-post grips the wire as the arm T advances toward the driving-shaft, and by this operation carries the wire Z through the tubular screw k'', between the dies M and M', and when it has arrived at this point the cam-block y brings its highest part in contact with the roller N, forcing inward the die M into contact with the wire Z, and so jamming the wire between the two dies M and M'. The cranks C and C' still advancing, the block D causes the heading-punch F to be brought in contact with the end of the wire projecting from the dies before named, which upsets the head of the wire, forming it into a symmetrical head within the die. This being accomplished, the cranks C and C', continuing to revolve, pull, through the connecting-rod Y, the block D outward, and at the same time the connecting-rod Y has raised the outer end of the lever h, causing that lever to carry upward the slides d and the triangular cam-plates g fixed to them until the angular faces of these last-named plates are brought up to the same plane as are the rollers o and o' in the levers H and H', so that these rollers, ascending to the highest point of the angular plates g, force outward the outer ends of the levers H and H' and inward the inner ends of these levers, causing the levers to bring together the cutting-chisels F' and F''', severing the wire between them, which has been advanced or fed through the dies a given distance corresponding to the length of the nail to be made, and at the same time pointing the nail. As soon as the wire has in this way been cut, it is freed from the cutting-chisel by a blow from the knocker-bar G, operated by the cam m on the crank C. This cam elevating one end of the bar G, forces the other end downward against the nail, knocking the nail free from the cutters, as before stated. When the wire has been fed in the manner described to the position required for its heading, the return-stroke of the arm T releases the binding force of the clamping-post c', so that the wire is not fed backward, the clamping-post resuming its function of nipping the wire and carrying it forward on the next forward stroke of the arm T in the manner before stated. This alternate clamping and releasing the wire is accomplished in the feed mechanism by the operation of the clamping-lever $d'$ and its spring $e'$ in this way: On the forward or feeding stroke of the arm T the tendency of the spring $e'$ to press against the longer end of the lever $d'$ causes that lever to turn on its fulcrum $s'$, forcing the clamping-post $c'$ to nip or jam the wire so that it may be carried forward, as before described; but on the return-stroke of the arm T the pressure on the clamping-post $c'$ operates the clamping-lever $d'$ against the force of the spring $e'$, and as a result the binding-post $c'$ is permitted to travel freely backward over the wire Z until the beginning of the next forward stroke, when the feeding proceeds, as stated. After the cutting-chisels have severed the wire in the manner described the slides $d$ are lowered vertically by the operation of the lever $h$ and the connecting-rod Y until the triangular cam-plates pass below and out of contact with the rollers $o$ of the cutting-levers H and H', so that the cutting-chisels remain inoperative until their function is again needed for cutting the wire, at which time the slides $d$ and triangular cam-plates $g$ ascend to actuate the cutting devices, as before described. That the dies M and M' may properly open for the admission of the wire, the pin $l'$, passing loosely through the plate L, impinges against the spring $m'$, and the spring exerts an elastic pressure on the pin $l'$, when the cam $y$ ceases to operate the roller N, and the die M wedges apart the die M' from the die M, and so opens the space between them for the admission of the wire. The degree of closeness of contact between the dies M and M', when actuated by the cam $y$, is regulated by the set-screws $a^3 b^3 c^3$, passing through the slide P, and the degree of cutting force of the cutters F' and $F^2$ is regulated or adjusted by the set-screws $p$ and $p'$, passing through the ends of the levers H and H'; and to adjust the plate L and its dies M and M' and tubular screw $k''$ so that they shall be in proper alignment with the cutters and heading-punch F, a set-screw, $d^3$, is provided; and to, in like manner, provide for the adjustment in line of the cutters F' and $F^2$ a set-screw, $e^3$, is provided, which effects that adjustment; and to provide for the adjustment of the heading-plunger, so that it may be thrust more or less from the block D, a wedge or gib, $t$, is interposed in a slot, $s$, in the block D and between one face of the recess in that block and the rear end of the punch. By adjusting this wedge up or down by means of a set-screw, $f^3$, as is obvious, the heading-punch is projected more or less from its block or chuck, and it is held in its desired position by a set-screw, $g^3$.

The dies M and M', as before stated, are practically rectangular in shape, with the sides of each die recessed to permit the passage of the wire, and countersunk to form a symmetrical head for the nail. By this arrangement and construction the abutting of the two dies against each other completes or forms the die proper, and when the dies have become worn from use it is only necessary to remove them and bring in contact two other sides, when new dies are at once produced and ready for use. This recessing of the dies provides for a great number of changes of the dies by simply shifting their contiguous sides.

Figs. 12 and 13 represent modifications in the construction of the details of the feeding mechanism. The effect produced by these modifications is the same as that hereinbefore described, but as a matter of convenience and reduced cost in some instances these modifications may be adopted, and so in Figs. 14, 15, and 16 are shown modifications of devices for operating the cutting-chisels. These last-named modifications tend to simplify to some extent the mechanism for operating the chisels which we have hereinbefore described and shown. Both of these modifications may be adopted on our wire-nail machine and produce satisfactory results without departing from the spirit of our invention.

Having now described our invention, what we claim as new, and desire to secure by Letters Patent of the United States, is—

1. The combination, in a wire-nail machine, of the following elements: a reciprocating block, D, vertical brackets $c$, fixed thereto, vertically-sliding blocks $d$, a lever, $h$, shaft $f$, connecting-rod Y, triangular cam-plates $g$, fixed at right angles to the lower end of the blocks $d$, rollers $o$ and $o'$, pivoted cutting-levers H and H', and cutting-chisels F' and $F^2$, as and for the purpose described.

2. In a wire-nail machine, the frame A, provided with the stationary block K, the block L, fitted in a recess in the block K and adjustable vertically by screw $d^3$, the dies M M', arranged in a recess in the face of block L, and movable transversely therein by the reciprocating bar P, rod R, cam $u$, cam-block $y$, and roller N, all combined and arranged to operate substantially as described.

3. In a wire-nail machine, clamping-dies to hold the nail-wire and nail while the nail is being headed, a heading-punch, and means, substantially as described, to move it up against the nail to head it and withdraw it from the nail after heading, and means, substantially as described, to advance the nail-rod and free it from the clamping-dies in which it has been headed, and project it into a clear space, so that it may be removed from the machine, in combination with the knocker G on the shaft E, operating-lever $l$, and its actuating-cam $m$, to forcibly eject the nail from the machine, substantially as set forth.

4. In a wire-nail machine, the combination of dies M and M', pressure-pin $l'$, and spring $m'$, bearing on the same, and suitable supporting and operating mechanism, as and for the purpose described.

5. In a wire-nail machine, the combination of cutting-chisels F' and F², means, as set forth, to support and operate them, set-screws $e^3$, and set-screws $p$ and $p'$, constructed and arranged for the purpose of adjusting said cutting-chisels.

6. In a wire-nail machine, in combination, a cam-plate, $y$, and means, as set forth, to reciprocate it, set-screws $a^3$ $b^3$ $c^3$, roller N, and die M, as and for the purpose described.

NELSON KING.
HARRY B. LESTER.

In presence of—
TRUMAN S. HICKCOX,
ALBERT H. MILLS.